United States Patent

Bocek

[15] 3,685,015

[45] Aug. 15, 1972

[54] CHARACTER BIT ERROR DETECTION AND CORRECTION

[72] Inventor: Robert P. Bocek, Penfield, N.Y.

[73] Assignee: Xerox Corporation, Stamford, Conn.

[22] Filed: Oct. 6, 1970

[21] Appl. No.: 78,428

[52] U.S. Cl.........340/146.1 F, 340/146.1 AG, 340/174.1 B

[51] Int. Cl...........................G06f 11/08, G06k 5/00

[58] Field of Search..................340/146.1 F, 174.1 B

[56] References Cited

UNITED STATES PATENTS

| | | | |
|---|---|---|---|
| 2,952,008 | 9/1960 | Mitchell et al. | 340/146.1 X |
| 3,281,804 | 10/1966 | Dirks | 340/146.1 X |
| 3,273,120 | 9/1966 | Dustin et al. | 340/146.1 |
| 2,897,480 | 7/1959 | Kumugai | 340/146.1 X |
| 3,234,518 | 2/1966 | Rakoczi et al. | 340/146.1 X |
| 3,237,157 | 2/1966 | Higby, Jr. | 340/146.1 |
| 3,320,598 | 5/1967 | Star | 340/174.1 |

FOREIGN PATENTS OR APPLICATIONS

| | | | |
|---|---|---|---|
| 913,230 | 12/1962 | Great Britain | 340/174.1 |

*Primary Examiner*—Charles E. Atkinson
*Attorney*—Paul M. Enlow, James J. Ralabate, John E. Beck and Irving Keschner

[57] ABSTRACT

Method and apparatus for detecting and correcting single bit errors in a bit pattern recorded on a two-track magnetic recording medium, the bit pattern including a parity bit. The bits corresponding to binary ones are recorded as flux transitions on one track and the bits corresponding to binary zeros are recorded as flux transitions on the other track. An error is defined if a flux transition is not detected in both tracks for a particular bit location or if flux transitions are detected in both tracks for a particular bit location. A detected error is shifted into an error register at the associated bit location as the bit pattern is shifted into a binary storage register. If established parity is not lost and the number of errors in the bit pattern which ended with the parity bit is not greater than one, the bit detected to be in error is complemented in the binary storage register.

4 Claims, 7 Drawing Figures

INVENTOR
ROBERT P. BOCEK
BY Irving Kerschner
ATTORNEY

CHARACTER BIT ERROR DETECTION AND CORRECTION

BACKGROUND OF THE INVENTION

In the digital data processing field there is often a requirement for large quantity storage of data that need be used only occasionally. For example, a data communications terminal may require a system for the temporary storage of locally generated data pending its later transmission over a telephone line and for the interim storage of received data pending its translation into forms suitable for data processing or to produce a printed output. In digital computer systems there is also a requirement for large quantity storage of data that may be used only occasionally. In large systems, this requirement is most often met by using a magnetic tape transport. Minicomputer systems often have these same requirements, although usually on a lesser scale. The magnetic tape transports available for large systems, although a possible solution, are not employed because the cost is generally higher than the minicomputer. Therefore, paper tape has been the solution generally employed. However, paper tape systems, although inexpensive, are not completely satisfactory. Their low speed, low storage density, irreversible memory characteristics, and bulky handling make them unsuitable in many applications. Several container-loaded magnetic tape transports (cassette-cartridge tape transports) designed as low cost memories for digital systems have recently come on the market.

The cassette-cartridge tape transports are basically simple, modest performance devices. They are relatively easy to operate and their manufacturing cost is fairly low. Hence, these devices provide a low cost solution to the problem of large capacity storage for small digital systems.

Some of the tape transports presently on the market include techniques for controlling errors recorded on the magnetic tape. While the prior art error control techniques differ in detail, they generally employ: (1) redundant recording of information; and (2) system flagging when an uncorrectable error has occurred. Redundant recording is achieved either by writing the same information on two separate tracks or on a single track of double (or triple) width. In the former case, two read amplifiers are used and logic circuits determine, on a bit-for-bit basis, which track is error free.

In general, the prior art techniques for detecting and correcting detected bit errors utilize complex and expensive circuitry to correct an error once it has been detected on the magnetic tape. For example, longitudinal parity generation or check is required in certain prior art systems in order to ascertain the location of the bit error. In addition, as set forth hereinabove, the redundant recording of information requires additional circuitry, thereby increasing the cost of the magnetic transport unit.

SUMMARY OF THE INVENTION

The present invention provides novel method and apparatus for detecting and controlling the errors recorded on a magnetic recording medium. In particular, a bit pattern is recorded on a two-track magnetic recording medium, the bit pattern including a parity bit. The bits corresponding to the binary ones are recorded as flux transitions on one track and the bits corresponding to binary zeros are recorded as flux transitions on the other track. An error is defined if a flux transition is not detected in both tracks for a particular bit location or if flux transitions are detected in both tracks for a particular bit location. A detected error is shifted into an error register at the associated bit location as the bit pattern is shifted into a binary storage register. If established parity is not lost and the number of errors in the bit pattern which ended with the parity bit is not greater than one, the bit detected to be in error is complemented in the binary storage register.

It is an object of the present invention to provide novel method and apparatus for detecting errors recorded on a magnetic recording medium.

It is another object of the present invention to provide novel method and apparatus for detecting errors recorded on a magnetic recording medium and for correcting the errors detected.

It is a further object of the present invention to provide novel method and apparatus for detecting and correcting a bit error in a bit pattern recorded on a magnetic recording medium, the bit pattern including a parity bit, if bit pattern parity is preserved.

It is an object of the present invention to provide novel method and apparatus for economically, simply and reliably detecting and correcting a single bit error for each bit pattern recorded on a magnetic recording medium.

DESCRIPTION OF THE DRAWING

For a better understanding of the invention as well as the objects and further features thereof, reference is made to the following detailed description which is to be read in conjunction with the accompanying drawing wherein:

FIG. 4(*a*) illustrates the occurrence of two bit errors in recorded bit pattern;

DESCRIPTION OF THE PREFERRED EMBODIMENT

Figure 1:
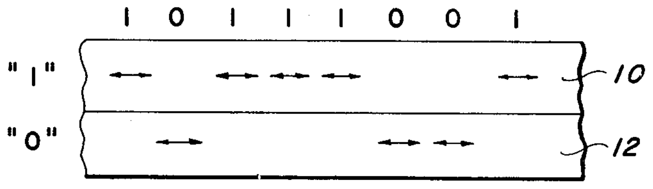
FIG. 1 illustrates how information may be recorded in the system of the present invention.

Referring now to FIG. 1, reference numbers 10 and 12 designate two tracks on a magnetic recording medium, such as tape or the like, containing recorded binary information. The line of binary digits, or bits, above track 10 corresponds to a bit pattern which represents the binary data, such as a binary encoded alphanumeric character, which is recorded on tracks 10 and 12, the arrows in the tracks 10 and 12 indicating the manner in which the track is magnetized to store this binary information. Track 10 will be referred to as the "1" track wherein all binary ones are recorded whereas track 12 is referred to as the "0" track wherein all the binary zeros are recorded. The recording technique illustrated in FIG. 1(*a*) is NRZI (Non Return to Zero mark). The arrows in tracks 10 and 12 indicate the manner which the tracks are magnetized to store the binary information.

Figure 2:
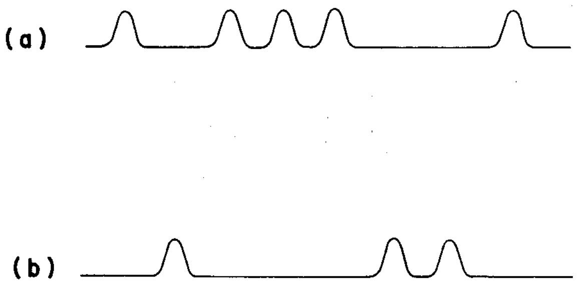
FIGS 2(*a*) and 2(*b*) illustrate the waveforms produced when the information recorded in FIG. 1 is read.

The magnetization of the tracks may be reversed repeatedly, each reversal of magnetization being referred to as a "flux transition" and represents the recording of a binary one in track 10, the flux transition representing binary zeros being shown in track 12. When the recorded information is readout by a magnetic reading or sensing device, each flux transition will produce an output pulse as it passes a reading station. When track 10 is readout by passing a reading station at a constant rate, the resulting pulse train that is produced corresponds to the waveform shown in FIG. 2(*a*). At the same time, track 12 is readout by passing a reading station at the constant rate, the resulting pulse train corresponding to the waveform shown in FIG. 2(*b*).

Figure 3:
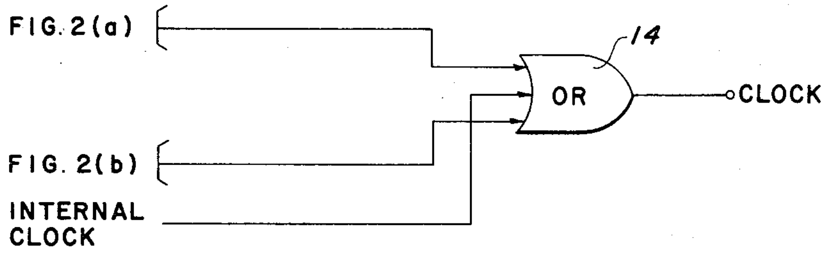
FIG. 3 illustrates generally how the data clock may be obtained from the information recorded as shown in FIG. 1.

When reading the magnetic tape, a data clock may be generated by essentially "ORing" the pulse trains produced by reading tracks 10 and 12 in OR gate 14 as shown in FIG. 3; thereby producing a system clock. It should be noted that in the event that a bit is lost, a clock internal to the tape transport (which is determined by the basic writing rate) may be utilized to generate a data clock bit so as not to lose bit synchronism. The internal clock (not shown) is applied to the other input of OR gate 14.

Figure 4:
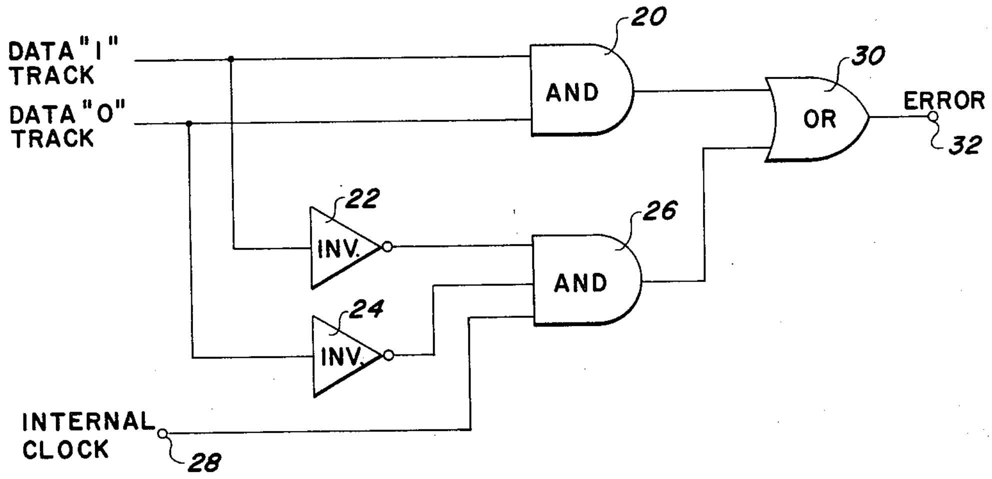
FIG. 4 is a simple schematic of the error detector which may be utilized in the present invention.
Figure 4A:
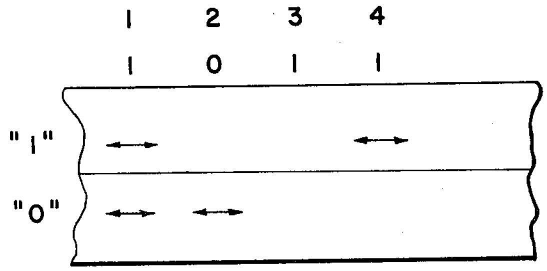

Referring now to FIG. 4, the logic diagram of the error detector utilized in the present invention is shown. An error is defined as the absence of a flux transition, or reversal, in both tracks corresponding to the associated data bit position within the data stream or the presence of flux transitions in both tracks at the same bit position as illustrated in FIG. 4(*a*). In this illustration, a flux transition has occurred in both the "1" and "0" track corresponding to the first data bit position. A flux transition has not been recorded in either the "1" or "0" track corresponding to the third data bit position. Therefore, an error signal will be generated at the first and third data bit position.

The output of the data "1" track and the data "0" track are applied to the input of AND gate 20. The output of data "1" track and the data "0" track are also applied to the input of inverters 22 and 24, respectively. The output of inverters 22 and 24 are applied to two of the inputs of three input AND gate 26. The internal clock is applied to the other input AND gate 26 via terminal 28. The outputs of AND gate 20 and 26 are connected to the input of OR gate 30, an output thereof corresponding to a detected error. In particular, when a flux transition is detected in both the "1" track and the "0" track, an output is generated by AND gate 20 and transmitted to terminal 32 via OR gate 30. If no flux transition is detected in either the "1" or "0" track at a particular time, the zero signals are inverted and applied as logic ones to AND gate 26. An output is generated by AND gate 26 and transmitted to terminal 32 via OR gate 30 at the internal clock rate.

Figure 5:
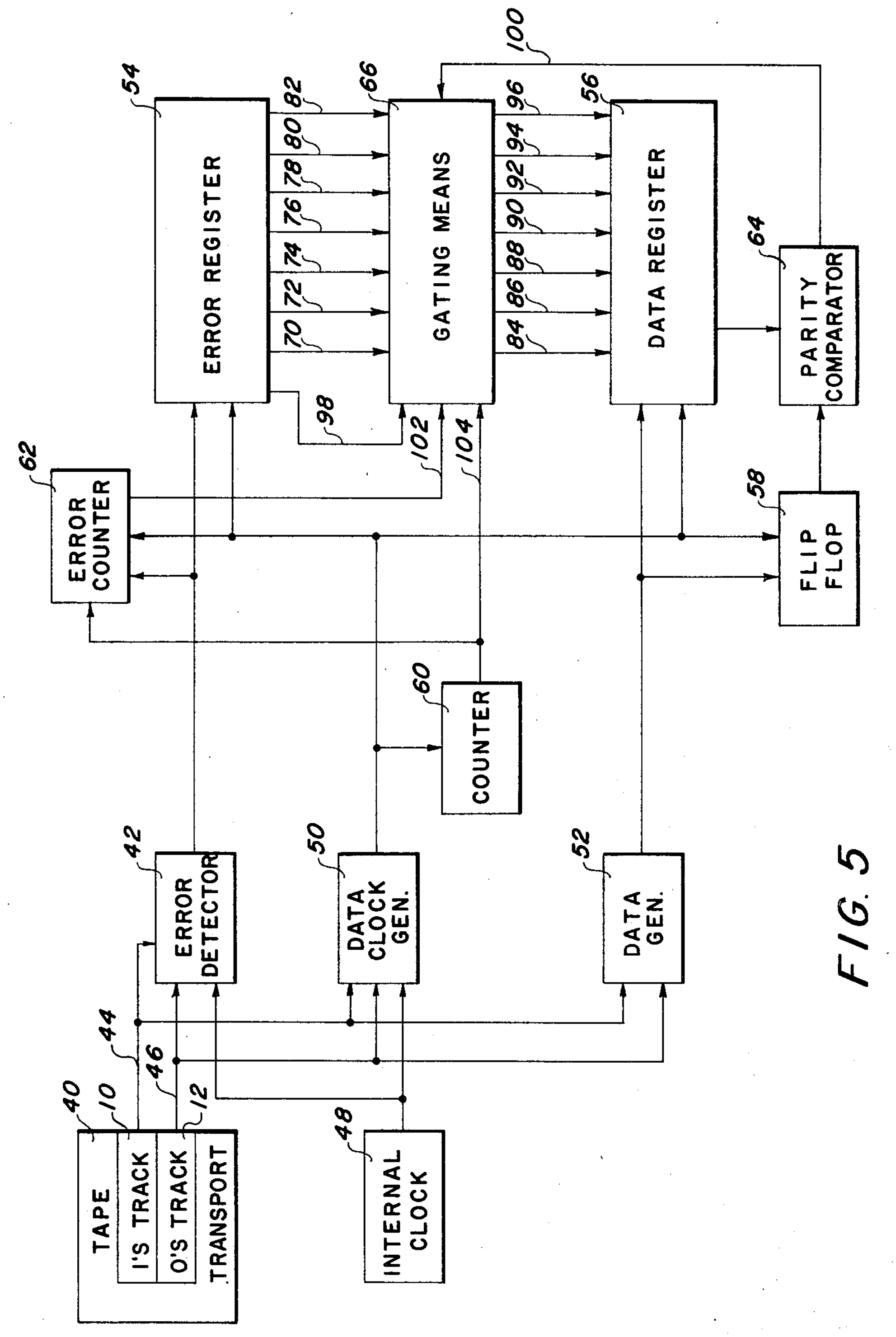
FIG. 5 is a block diagram of the novel error detection and correction apparatus of the present invention.

Referring now to FIG. 5, a block diagram of the novel error detection and correction apparatus of the present invention is illustrated. A tape transport unit 40 includes, for example, a two-track cassette, having data recorded thereon in the manner described with reference to FIG. 1. The two tracks 10 and 12 of transport unit 40 are readout or sensed, by known techniques and are coupled to error detector 42 via leads 44 and 46, respectively. The details of error detector 42 were described hereinabove with reference to FIG. 4. A clock 48, internal to tape unit 40, is coupled to the other input of error detector 42. The output of the tape transport unit 40 is also coupled to data clock generator 50 and data generator 52. The output of internal clock 48 is coupled to the other input of data clock generator 50. Data clock generator 50, shown in detail in FIG. 3, shifts the error signal generated by error detector 42 into error register 54 and the data signals at the output of data generator 52 into data register 56. The data generator 52 is basically a flip-flop which presents a binary, or logic level, "1" to data register 56 when a flux reversal appears in the "1" track and presents a logic level "0" when a flux reversal is detected in the "0" track. Therefore, every bit of data in the data register 56 has an indication at the same bit position within error register 54 whether it is a "doubtful" bit. It may or may not be correct as data generator 52 initially was in a 1 or 0 state when the error was detected.

As data is shifted into data register 56, a running parity bit is generated by flip-flop 58. Flip-flop 58 changes state as logic "1's" are read into data register 56 for each bit except the parity bit. In an even parity scheme, the number of binary "1" bits in the bit pattern entered into data register 56 including the parity bit should be an even number. When bit character counter 60 counts the number of the bits in the bit pattern (character plus parity bit, the bits per character in this embodiment being selected to be seven), a comparison is made of the parity bit read from data register 56 and the output of flip-flop 58. This comparison will have no effect, however, if error counter 62 (which increments every time an error is shifted into the error register 54 and is reset after the time the correction may occur to the data in data register 56) contains the number two or more. This is because the correction can be made only on a single bit within a bit pattern, or character. In addition, if the parity bit read into data register 56 is in doubt (as indicated by a bit in error register 54 at the same bit location as the parity bit) then no correction is possible. If, however, only one bit is in doubt and that bit is not the parity bit, then the comparison of the parity bit read and the parity bit generated will determine if the "doubtful" data bit is correct or should be complemented. In other words, if the output of flip-flop 58 compares with the output of data register 56 at the parity bit location, the data bit is correct. If the outputs do not compare then the "doubtful" data bit is erroneous and should be complemented. The location of the bit to be complemented in data register 56 is indicated by error register 54 which enables an associated gate in gating means 66 via lead 70, 72, . . . 80 or 82. The selected gate is coupled to the corresponding storage element, or flip-flop, in data register 56 via lead 84, 86, . . . 94 or 96 to complement the data bit in that flip-flop.

An alternate method of determining whether the doubtful bit is to be complemented simplifies the block diagram of FIG. 5 by removing comparator 64. In this method, flip-flop 58 changes state for every logic "1" bit shifted into the data register 56 including the parity bit of the bit pattern. If after shifting in the entire bit pattern flip-flop 58 is in the set state (logic "1") then the doubtful bit is in error and a signal is applied to gating means 66 via lead 100 to complement the erroneous bit in data register 56. If flip-flop 58 is in the reset state (logic "0"), the doubtful bit is correct and no correction is necessary.

Figure 6:
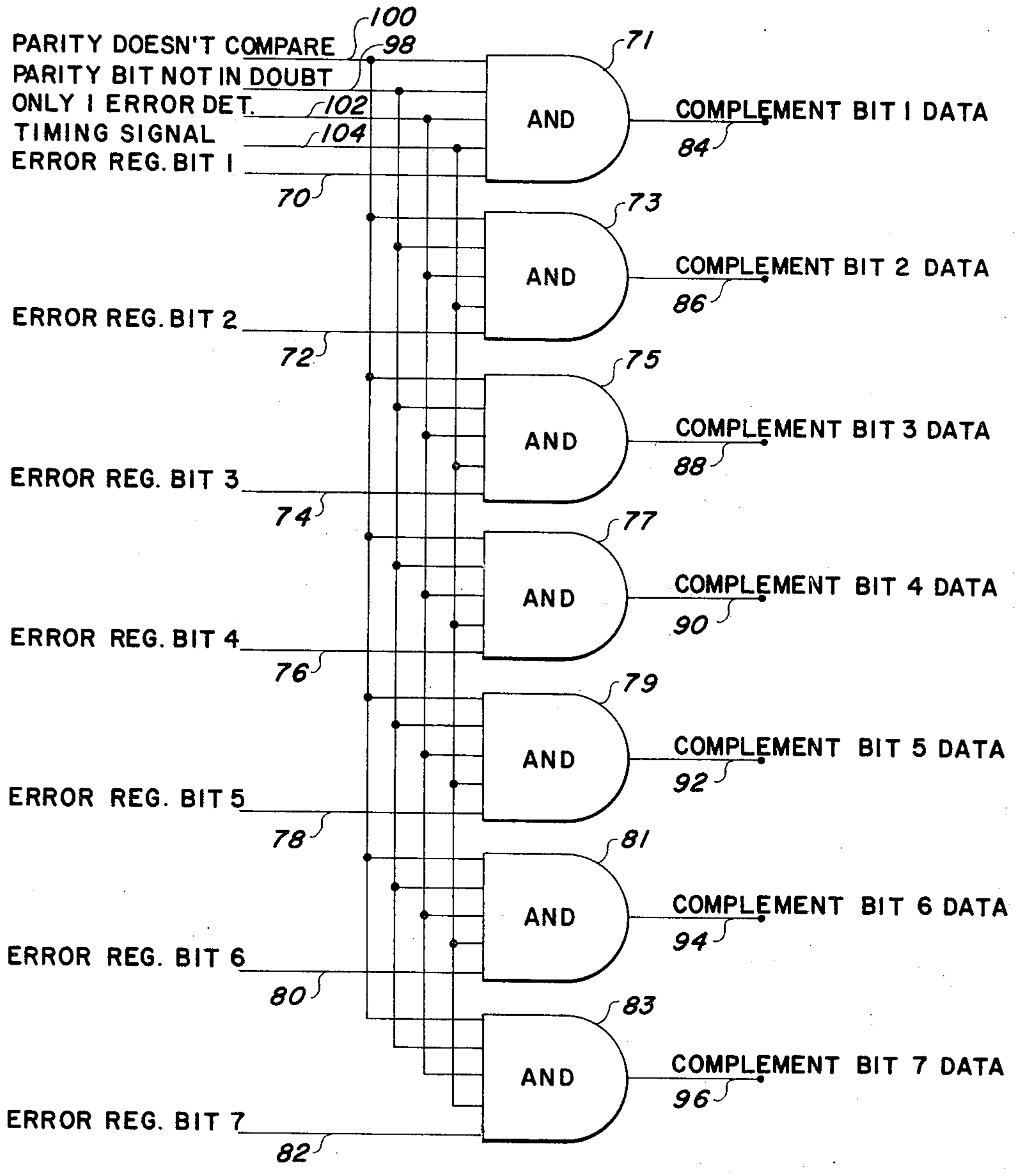
FIG. 6 is a logic diagram of the gating circuitry utilized in the block diagram of FIG. 5.

Referring now to FIG. 6, the logic diagram of gating means 66 shown in FIG. 5 is illustrated. AND gates 71, 73, . . . 81 and 83 correspond to the 7 data bits of the stored data, or character, in data register 66. One of the five inputs to each of the AND gates includes the output of error register 64. The output from error register 64 determines whether the parity bit is not in "doubt" and is applied to the gates via lead 98. Another input to each of the AND gates is the output of parity comparator 64 which determines whether or not parity compares with the generated parity bit. This is applied to the gates via lead 100. The third common input to the AND gates is generated at the output of error counter 62 and applied to the AND gates via lead 102. The fourth common input to each of the gates is applied by counter 60 via lead 104. The remaining inputs to the gates are applied via leads 70, 72, . . . 80 and 82 and correspond to the error register bits 1 through 7, respectively. The output of AND gates 71, 73, . . . 81 and 83 are coupled to the corresponding flip-flops in data register 56 and acts to complement the data bit stored in error.

As set forth hereinabove, each of the AND gates can be enabled only if three conditions are met. The first condition is that a signal is generated on lead 98 indicating that the parity bit is not in "doubt." Secondly, a signal on lead 100 must be present indicating that parity has been unsuccessfully compared. Thirdly, a signal must be on lead 102 indicating that only one error has been detected. Finally, lead 104 presents the signals to the AND gates at the time at which a correction is to be made. To determine which of the AND gates is enabled, a signal appears on lead 70, 72, . . . 80 and 82. For example, if an error is detected in the third character bit, a signal is applied to lead 74 while the signals on leads 70, 72, 76, 78, 80 and 82 are zero. A signal appears on lead 74, thereby enabling AND gate 75 and producing an output signal on lead 88. This signal is coupled to the flip-flop in data register 56 corresponding to the third character bit and complements that data bit. For example, if the flip-flop in data register 56 corresponding to bit 3 is in the zero state, the flip-flop is reset to one. Conversely, if the flip-flop is in the one state, the flip-flop will reset to zero.

While the invention has been described with reference to its preferred embodiments, it will be understood by those skilled in the art that various changes may be made and equivalents may be substituted for elements thereof without departing form the true spirit and scope of the invention. In addition, many modifications may be made to adapt a particular situation or material to the teaching of the invention without departing from its essential teachings.

What is claimed is:

1. Apparatus for correcting errors detected in a bit pattern recorded as transitions in a magnetic recording medium along first and second tracks, said bit pattern comprising a plurality of binary bits and a parity bit, each bit being either a binary one or zero, said apparatus comprising:

means for recording the binary one bits of said bit pattern as flux transitions along said first track and the binary zero bits of said bit pattern as flux transitions along said second track, means for reading the bits recorded on said first and second tracks and producing electrical pulses corresponding to each transition, first means coupled to said reading means for generating an error signal when no flux transition occurs at a bit position along said first and second tracks or if there are flux transitions at a bit position along both of said first and second tracks, second means coupled to said reading means for generating said bit pattern, means coupled to said second means for storing said generated bit pattern, means coupled to said second means for forming a parity bit as the generated bit pattern is being stored, means responsive to said error signal for comparing the formed parity bit and the stored parity bit and producing a correction signal if the compared bits are not the same, and gating means coupled between said first means and said storage means and responsive to said correction signal for forming the complement in said storage means of the bit detected to be in error.

2. The apparatus as defined in claim 1 further including means coupled between said second means and said storage means for determining if bit pattern parity has been lost and inhibiting said gating means if parity is lost.

3. The apparatus as defined in claim 2 further including means inhibiting said gating means when two or more errors are detected in said bit pattern or if the parity bit has been detected to be in error by said first means.

4. A method of detecting errors in a bit pattern recorded as magnetic flux transitions on a magnetic recording medium along first and second tracks, said bit pattern comprising a plurality of binary bits and a parity bit, each bit being either a binary one or binary zero, said method comprising the steps of recording the binary one bits of said bit pattern as transitions along said first track, recording the binary zero bits of said bit pattern as transitions along said second track, reading said bit pattern from said first and second tracks, storing the bit pattern read from said first and second tracks, forming a parity bit as the bit pattern is being stored, generating an error signal during the step of reading if no flux transition is detected at a bit position along said first and second tracks or if there are flux transitions at a bit position along both said first and second tracks, comparing the formed parity bit with the stored parity bit in response to the error signal, producing a correction signal if the compared parity bits are not the same, and complementing the stored bit detected to be in error as indicated by said generated error signal in response to said correction signal.

* * * * *